United States Patent [19]

Fukuda

[11] 4,171,627

[45] Oct. 23, 1979

[54] SHAFT COUPLING

[75] Inventor: Kazuichi Fukuda, Fujisawa, Japan

[73] Assignee: Kanto Special Steel Works Ltd., Fujisawa, Japan

[21] Appl. No.: 728,882

[22] Filed: Oct. 1, 1976

[30] Foreign Application Priority Data

| Sep. 30, 1975 | [JP] | Japan | 50-117829 |
| Dec. 27, 1975 | [JP] | Japan | 50-155813 |
| Jan. 13, 1976 | [JP] | Japan | 51-2436 |

[51] Int. Cl.² ............................................. F16D 3/52
[52] U.S. Cl. .................................. 64/15 C; 64/27 C; 64/DIG. 2
[58] Field of Search ............... 64/27 C, 15 C, DIG. 2

[56] References Cited

U.S. PATENT DOCUMENTS

| 1,258,639 | 3/1918 | Eaton | 64/27 C |
| 1,347,907 | 7/1920 | Kronfeld | 64/27 C |
| 2,096,039 | 10/1937 | Higgins | 64/15 C |
| 2,436,248 | 2/1948 | Cardillo | 64/27 C |
| 2,439,919 | 4/1948 | Brecht | 64/15 C |
| 2,895,316 | 7/1959 | Kloud | 64/27 C |
| 3,080,733 | 3/1963 | Crankshaw | 64/15 C |

FOREIGN PATENT DOCUMENTS

| 1072703 | 1/1953 | France | 64/27 C |
| 318950 | 3/1957 | Switzerland | 64/15 C |

Primary Examiner—Carlton R. Croyle
Assistant Examiner—Edward Look
Attorney, Agent, or Firm—Wenderoth, Lind & Ponack

[57] ABSTRACT

A shaft coupling is provided which has two hubs which are fixed, respectively, on the drive shaft and the driven shaft thereof, and which are connected with each other in the rotational direction by means of elastic elements such as coil springs, so that mutual misalignment between the drive shaft and the driven shaft is accommodated by free displacement of spring assemblies in spaces which are provided for receiving the spring assemblies, respectively in a disk-shaped member on the drive shaft and in the flanges of a spring assembly holder fixed on the hub on the driven shaft, whereby any shock produced by a change of load can be absorbed by the elastic elements and rotation of the drive shaft can be transmitted smoothly to the driven shaft.

10 Claims, 32 Drawing Figures

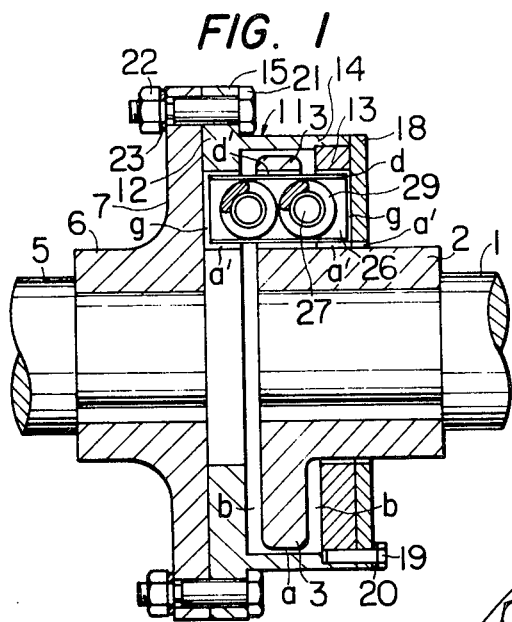
FIG. 1
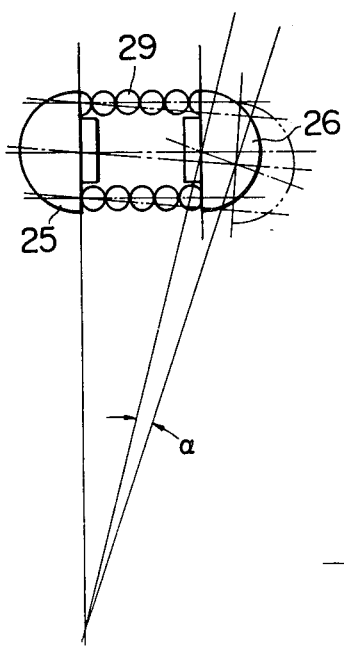
FIG. 2
FIG. 4b
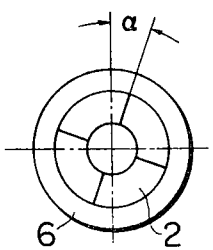
FIG. 4a
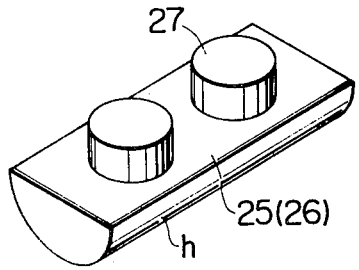
FIG. 3

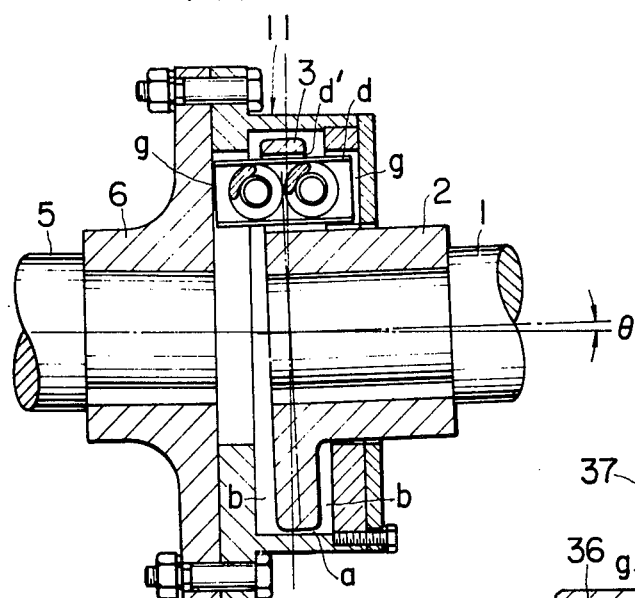
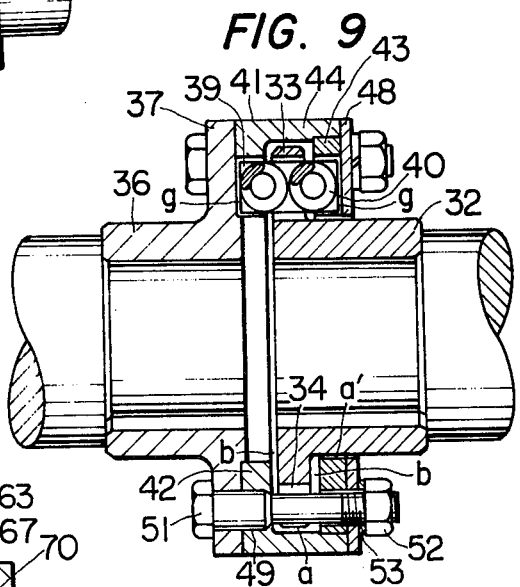
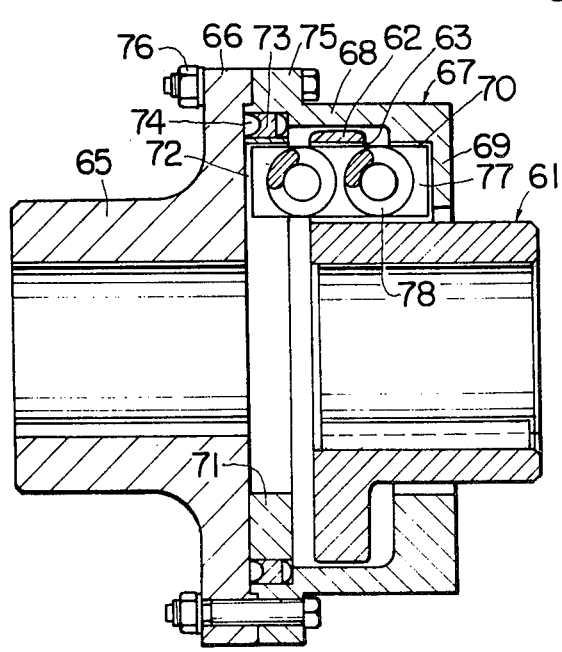

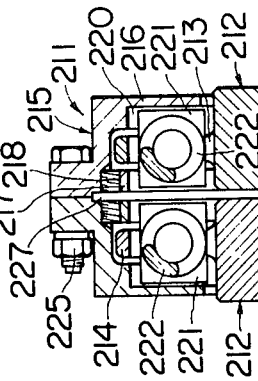
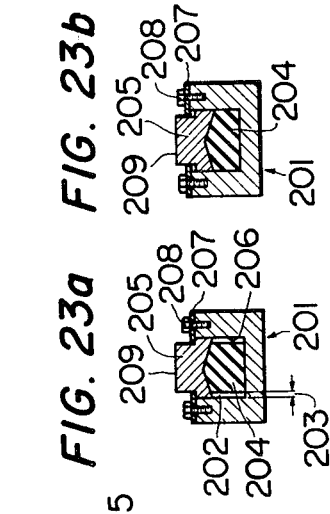
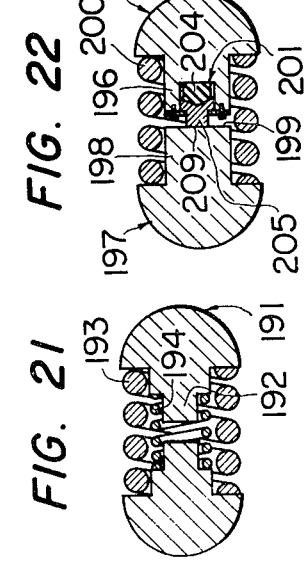
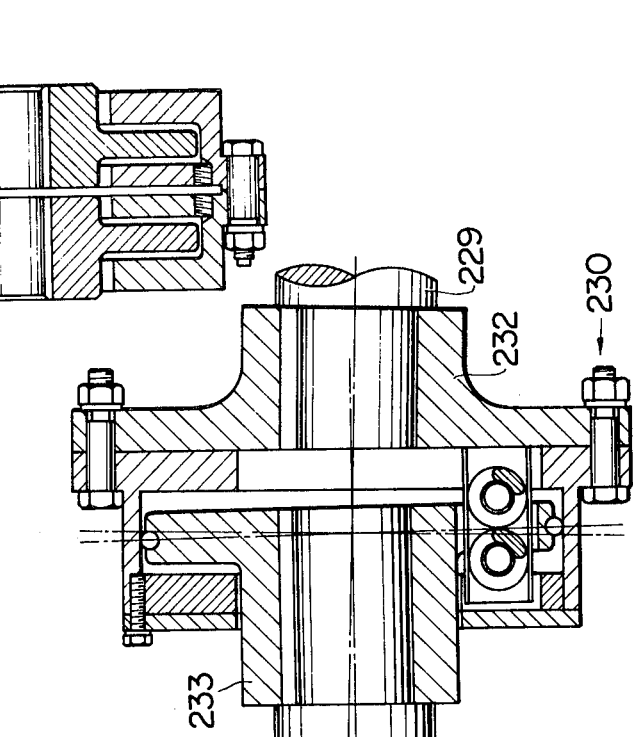
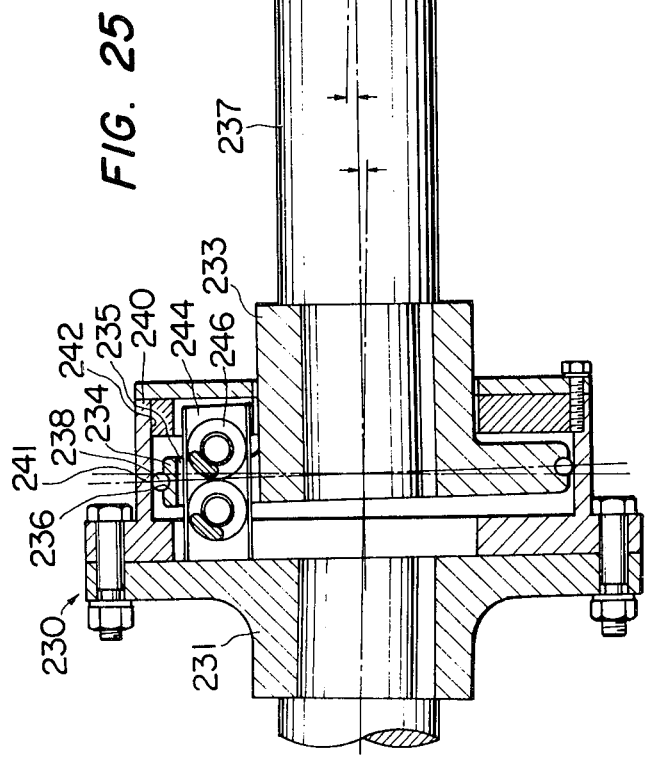

SHAFT COUPLING

BACKGROUND OF THE INVENTION

The present invention relates to a shaft coupling for transmitting a comparatively great torque, particularly by accomodating mutual misalignments of the shafts and/or by absorbing shocks on the shafts.

Shaft couplings for rotating shafts which are capable of transmitting torque despite mutual misalignment thereof are widely used. Among such couplings are flexible couplings which have rubber members or metal springs as elastic elements for accomodating mutual misalignments of the shafts, and the gear couplings which utilize the sliding between teeth of internal and external gears. A flexible coupling which uses such elastic elements as rubber members transmits a small amount of torque compared with other types of couplings, and therefore it cannot be used for transmitting a large torque, say, of several thousand kgs-m. In the gear coupling, the tooth faces subjected to wear or spalling, such damage sometimes causing an increase of space between the teeth, finally making it necessary to replace the coupling itself. In order to prevent wear of the tooth faces, so as to solve the abovementioned drawback, the tooth faces must be lubricated sufficiently, which requires troublesome inspection and maintenance of the coupling, such trouble being undesirable from the standpoint of the recent tendency of reducing the amount of manpower used in industry.

On the other hand, the rollers of a roller table which carry slabs or plates in rolling mills, and machine tools, pumps, air compressors and rolling stocks use a flexible coupling which is for transmitting a smallertorque, say 100 kgs-m, compared with the large amount of torque to be transmitted by the former kind of flexible coupling. For the latter kind of flexible coupling gear couplings are used in most cases, causing the same drawbacks described above. Likewise, disk couplings are used, but they are deficient from the standpoint of strength and accuracy in finishing.

In addition to gear couplings and disk couplings, there are used tire-type flexible rubber couplings which are covered with a high shear strength rubber. There is also another kind of shaft coupling which comprises flat steel springs wound in the form of a grid over specially shaped grooves cut into each hub.

This kind of flexible rubber coupling transmits a smaller amount of torque relative to its great size; moreover, the bolts thereof must be tightened from time to time. The shaft coupling having the flat steel springs requires lublication, and has a tooth face and grid member subjected to severe wear; and its capacity for accomodation of misalignments is small. Both of the abovedescribed shaft couplings have low heat resistance.

Generally shaft couplings must transmit torque and absorb shocks as well as accomodating mutual misalignments of the shafts. In machine tools, there frequently occur sudden changes of the load at the start and finish of operation or during operation. Such sudden changes of the load cause impacts to be produced in the direction of rotation; and if such impacts are produced repeatedly, fatigue failure of the shafts, damage of the key way or like troubles may occur in the driving force transmission system.

In order to absorb impacts in the shafting for transmitting a comparatively great torque in the case of such machinery, there are used clutch couplings, hydraulic transmission couplings or the like, but these couplings do not have the capability of accomodating mutual misalignment of shafts. Therefore, there is strong demand by users of machinery and equipment in various industries for a shaft coupling which can transmit a large torque for a small size, and which can accomodate mutual misalignments of shafts and also absorb shock.

SUMMARY OF THE INVENTION

It is an object of the present invention to provide a shaft coupling which can transmit a comparatively great torque, can accomodate mutual misalignments of shafts, is as compact as a gear coupling of the conventional type, and is sufficiently strong to be used as to stand for a long period.

Another object of the present invention is to provide a shaft coupling which has a simple construction and is so economical as to require no lubrication, its use thus saving labor in inspection and maintenance. A further object of the present invention is to provide a shaft coupling which can be produced very easily without high accuracy being required in finishing and without using any such special equipment as a gear cutting machine. A still further object of the present invention is to provide a shaft coupling which has a small size and a simple construction, and which can absorb impacts produced in the shafting while transmitting a comparatively great torque. A still further object of the present invention is to provide a shaft coupling which has an intermediate shaft connected with a coupling respectively at both ends thereof, and which can accomodate a greater mutual misalignments of shafts and/or absorb a greater impact.

In order to achieve the abovementioned objects, the shaft coupling of the present invention has two hubs which are fixed, respectively, on the drive shaft and the driven shaft thereof, and which are connected to each other in the rotational direction by means of such elastic elements as coil springs, so that mutual misalignments between the drive shaft and the driven shaft are accomodated by free displacement of spring assemblies in spaces which are provided for receiving the spring assemblies, respectively in a disk-shaped member on the drive shaft and in a flange of a spring assembly holder fixed on a hub fixed on the driven shaft, whereby shocks produced by a change of load are absorbed by the elastic elements and rotation of the drive shaft is transmitted smoothly to the driven shaft.

BRIEF DESCRIPTION OF THE DRAWINGS

FIG. 1 is an axial sectional view according to a shaft coupling of the present invention;

FIG. 2 is a transverse sectional view of the shaft coupling of FIG. 1;

FIG. 3 is a perspective view of a spring seat used for the shaft coupling of FIG. 1;

FIGS. 4a and 4b are diagrams for explaining the function of the shaft coupling of FIG. 1 when relative rotation in the circumferential direction takes place between the drive shaft and the driven shaft, FIG. 4(a) being a schematic illustration of the shaft coupling and FIG. 4(b) being a schematic illustration of a coil spring section;

FIG. 8 is an axial sectional view of the shaft coupling when there is angular misalignment between the drive shaft and the driven shaft;

FIG. 9 is an axial sectional view of another embodiment of the shaft coupling of the present invention;

FIG. 10 is an axial sectional view of a further embodiment of the shaft coupling of the present invention;

FIG. 21 is an axial sectional view of an elastic element having two coil springs;

FIG. 22 is an axial sectional view of an elastic element having a coil spring and a spring mechanism for enhancing the resiliency of the elastic element;

FIGS. 23a and 23b are enlarged sectional views of the spring mechanisms shown in FIG. 22, FIG. 23 showing the mechanism before being deformed, and FIG. 23b showing the mechanism after being deformed;

FIG. 24 is an axial sectional view of a shaft coupling having two coupling units connected to each other;

FIG. 25 is an axial sectional view of a shaft coupling consisting of an intermediate shaft combined with two subsidiary shaft couplings;

DESCRIPTION OF THE PREFERRED EMBODIMENTS

Figure 5:
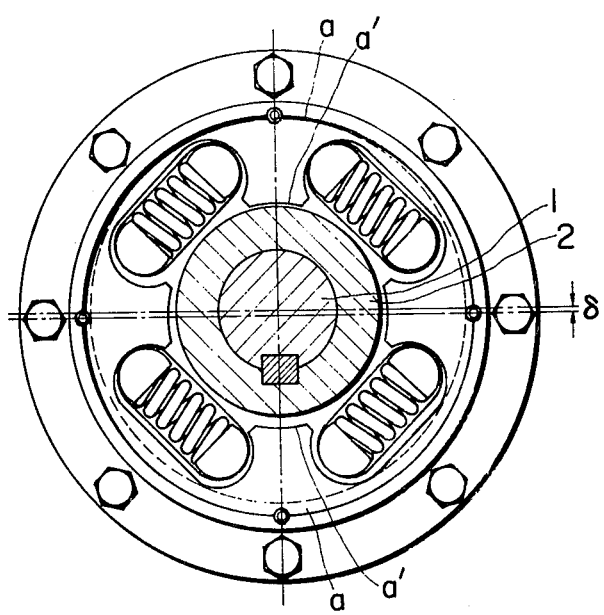
FIG. 5 is a transverse sectional view of the shaft coupling when there is axial misalignment between the drive shaft and the driven shaft.

Referring to FIGS. 1 and 2, a drive shaft 1 has a drive shaft hub 2 fixed at the end thereof, and a driven shaft 5 has a driven shaft hub 6 fixed at the end thereof.

At the end portion of the drive shaft hub 2 there is provided a disk-shaped projection 3 extending in the radial direction. Said projection 3 is interposed between a fixed flange 12 of a spring assembly holder (denoted by 11 as a whole) and a removable flange 13 thereof which can be removed when necessary, and a cylindrical ring-shaped section 14 thereby producing a gap a being left in the radial direction between projection 3 and section 14 and a space b being left in the axial direction both between the projection 3 and the flange 12 and between projection 3 and flange 13, and a gap a' being left between the outer surface of said hub 2 and the inner surface of the spring assembly holder 3 and the inner surface of a stop disk 18 fixed on said holder.

On the end portion of the driven shaft hub 6 there is provided a flange 7 extending in the radial direction. Said flange 7 and a projection 15 on the fixed flange 12 which has a larger diameter than the cylindrical, ring-shaped section 14, are integrally connected by reamer bolts 21.

Spring assembly receiving spaces d and d' are provided, as follows:

Elongated openings d are provided at corresponding positions in flanges 12 and 13 having semi-cylindrical spring-seat receiving faces c at the opposite ends thereof, and elongated openings d' are provided in projection 3 at positions corresponding to the openings d in flanges 12 and 13, these openings d' having semi-cylindrical spring-seat receiving faces c' at the opposite ends. The length of the openings d' in projection 3 are somewhat shorter than those in flanges 12 and the faces c' have the same or a somewhat smaller radius than that of the faces c; the openings d and d' with faces c and c' together axially of the coupling forming, respectively, spring assembly receiving spaces. Four such spaces are positioned tangentially to hub 2.

In each of these spaces is positioned a spring assembly which is constituted by two spring seats 25 and 26 positioned respectively at both ends of two coil springs 29. Two coil springs 29 are used for each spring assembly, totalling eight springs for each shaft coupling. Each spring 29 is supported at both ends by projections 27 on the spring seats 25 and 26 extending into the interior of the coil springs. As shown in FIG. 3, the spring seats 25 and 26 have a semicylindrical face h on the side opposite the face supporting the coil springs 29.

FIGS. 1 and 2 show an embodiment in which two coil springs are provided in each spring assembly; but the number of coil springs may be changed to one or more than three according to the amount of torque to be transmitted.

In normal cases, spring-seat receiving faces c and c' have a larger diameter than the cylindrical faces of the spring seats 25 and 26, for better accomodation of mutual misalignments of the shafts, as described below.

Therefore, when all eight pieces of the coil springs 29 are mounted in the spring assembly receiving spaces under an appropriate compression, at no load condition of the coupling, the spring seats are against faces c' in the projection 3 and gaps e are left between the seats 25 and 26 and faces c on flanges 12 and 13, and gaps f are left along the sides of spaces d and d'.

On application of torque to drive shaft 1 the hub 2 rotates relative to the spring assembly holder 11 and the spring seat receiving faces c of the fixed flange 12 and the demountable flange 13 of the spring assembly holder 11 are engaged by the spring seats 25 and 26, and the coil springs 29 supported by the spring seats 25 and 26 are compressed. Compression occurs when rotation is in either direction. The greater the torque transmitted from the drive shaft to the driven shaft becomes, the more the coil springs 29 are compressed, until the coils are against each other. Thus, rotation force is transmitted from the drive shaft 1 to the driven shaft 2, through the drive shaft hub 2 the spring seat 25, the coil springs 29, the spring seat 26, the spring assembly holder 11, and the driven shaft hub 6. During transmitting of torque, rotation continues always keeping the torque and the resilient force of the coil spring 29 in balance. Therefore, when a shock occurs on the shaft on output side at the start of rotation or an impulse load occurs, the shock is absorbed by elastic deformation of the coil springs 29. Further, when the torque is such that the coil springs 29 are fully compressed, if they are designed so that the limit of fatigue is not exceeded in this condition, the coil springs 29 will remain undamaged for a long period of time.

FIGS. 4 and 4b explain the above described effect.

FIG. 4a is a schematic illustration of the state of the shaft coupling when there is relative rotation between the drive shaft and the driven shaft. FIG. 4b is a schematic view of the coil springs in such case. In FIG. 4, α denotes the angle of rotation of the drive shaft relative to the driven shaft.

If the value of the deflection load on the coil springs 29 is appropriate for the operation conditions, they will be able to absorb impulse torque produced on the driving side of a resistance shock on the from output side and to protect every part of the coupling and the transmitting system. The stop disk 18, which is connected with the demountable flange 13 of the spring assembly holder 11 by the bolts 19 and the spring washer 20 prevents the spring assembly consisting of coil springs 29 and spring seats 25 and 26 from slipping out of the spring receiving spaces.

The following is explanation of the action of the coupling of the present invention in accomodating axial misalignment of the shafts.

The disk-shaped projection 3 on the drive shaft hub 2, the fixed flange 12, the removable flange 13 and the ring-shaped section 14 of the spring assembly holder 11 are positioned so as not to contact each other, the gaps a, b and a' being provided. Furthermore, there are provided the gaps e and f between the spring seat receiving faces c and c' and the spring seats 25 and 26. All of these gaps are left open when there is no mutual misalignment of shafts, that is, when there is no angular or axial misalignment of the shafts and no displacement in the axial direction of the shafts.

Figure 6A:
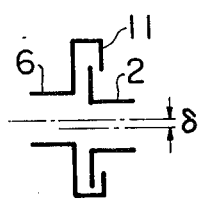
FIG. 6(a) being a schematic illustration of the shaft coupling and FIG. 6(b) being a schematic illustration of the displacement of the spring seat.
Figure 6B:
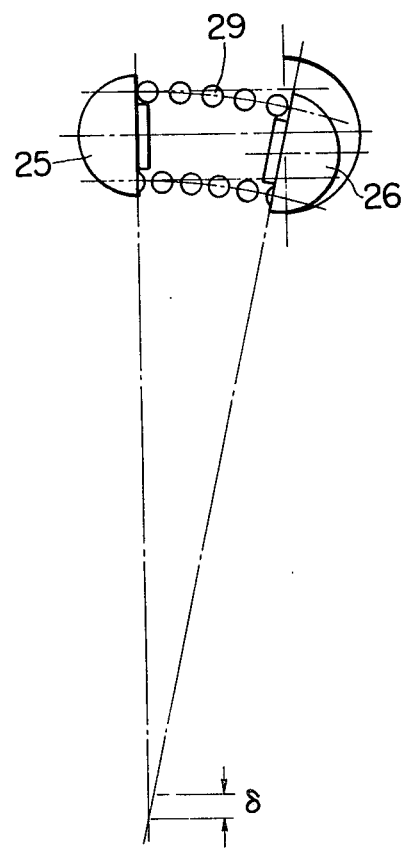
FIG. 6 is a diagram for explaining the function of the shaft coupling when there is axial misalignment between the drive shaft and the driven shaft.

FIG. 5 is a transverse sectional view of the shaft coupling showing the positions of the parts when there is axial misalignment of an amount δ between the drive shaft 1 and the driven shaft 5. The parts of FIG. 6 show schematically the accomodation of said misalignment. At no load, axial misalignment δ between the drive shaft 1 and the driven shaft 5 can be accomodated within the range limited only by the size of the gaps a, e and f shown in FIG. 2. If the coupling is rotated by the drive shaft 1, the coil springs 29 are compressed in the axial direction of the respective coil springs, the amount of compression of the coil spring 29 under pressure varying according to the amount of torque. In this case, the gaps e between the spring seats 25 and the spring seat receiving faces c' provided in the disk-shaped projection 3 of the drive shaft hub 2 as shown in FIG. 6b and the spring seat receiving faces c provided in the fixed flange 12 and the removable flange 13 of the spring assembly holder 11 become greater than during the no load condition, making the amount of axial misalignment which can be accomodated far greater than in the no load condition.

Thus while torque is transmitted from the drive shaft 1 to the driven shaft 5, axial misalignment of shafts is accomodated smoothly even under no load conditions.

As for displacement of the shafts in the axial direction in an amount of δ', such displacement can be accomodated within the range of the width of the gap b, that is, unless and until the disk-shaped projection 3 of the drive shaft hub 2 contacts either the fixed flange 12 or the demountable flange 13 of the spring assembly holder 11.

Figure 7:
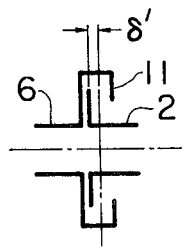
FIG. 7 is a schematic illustration of displacement in the axial direction of the drive shaft and the driven shaft.

FIG. 7 is a schematic illustration of such axial displacement. Displacement of the shafts in the axial direction in an amount of δ' is accomodated by means of slippage between the spring seats 25 and 26 and the spring seat receiving faces c, c' or elastic deformation of the coil springs 29 in a direction perpendicular to the axial direction.

As for angular misalignment of shafts, such misalignment is divided into misalignment which varies by the combined amount of the axial misalignment and displacement of the shafts in the axial direction conformed to the rotation angle.

Therefore, even at no load condition, such misalignment can be accomodated by the combined effects of the above described means during rotation. Furthermore, in order to avoid interference due to the contact of the respective ends of the spring seats 25 and 26 during operation and when there is angular misalignment of the shafts, a gap a is provided between the driven shaft hub 6 and the stop disk 18.

The present invention thus provides a buffer coupling for absorbing impulse force as well as a flexible coupling, the coupling of the present invention being far superior in its capacity for shock absorption to couplings of the conventional type such as a gear coupling or a chain coupling which can accomodate only a small amount of mutual misalignment between the drive shaft and the driven shaft.

In further regard to a gear coupling and a chain coupling, axial misalignment therein necessarily causes slippage, which will cause damage to the contacting portions unless lubrication is good.

In the coupling according to the present invention, it is true there is a possibility of producing a slight slippage between the spring seat and the spring seat receiving face, but the results of experiments proves that almost no wear is produced even after continuous use without lubrication for several years.

Also, the coil springs used for shock absorption are free from aging effects while the rubber of a rubber coupling can not be prevented from aging, so that the coupling of this invention retains its good quality for a long period.

As mentioned above, the coupling of the present invention will have a far better effect if it is used in place of a coupling of the conventional type such as a gear coupling, a chain coupling or a rubber coupling; more specifically, if it is used for large-sized machine tools, such as construction machines or the like which are constantly subjected to impacts and changing leads, thus producing a high possility of mutual misalignments of shafts, wear of the parts of the transmission mechanism thereof will be greatly reduced.

The above explanation is of an embodiment using four spring assemblies. But there is no restriction on the number of such assemblies; any plural number that is determined to be appropriate from the standpoint of design may be used. Furthermore, it is possible to use a hydraulic buffer, a buffer made by a compound structure of a ring spring or metal spring and rubber members, as well as coil springs, depending on the effects it is desired to obtain.

The shaft coupling shown in FIG. 9 is another embodiment of the present invention. This coupling utilizes reamer bolts as a connection means and is compact, having a limited size outer diameter while still functioning efficiently; therefore, it can be manufactured at a low production cost.

As shown in FIG. 9, the construction of the coupling of this embodiment is the same, in principle, as that of the first-described embodiment. However, in this embodiment, there is no projection on the circumference of the spring assembly holder as in the first-described embodiment; but as shown in FIG. 9, between two adjacent spring assemblies around the circumference of the coupling there is provided a hole 49 which extends through the flange 37 of the driven shaft hub 36, the fixed flange 42 of the spring assembly holder 41, the disk-shaped projection 33 on the drive shaft hub 32, the removable flange 43 of the spring assembly holder 41 and the stop disk 48; and all of these elements are integrally connected by a reamer bolt 51. In this embodiment, the diameter of the hold 34 in the disk-shaped projection 33 on the drive shaft hub 32 is larger than the bolt so that there is no contact between the bolt and the projection 33. The bolt 51 is secured by a nut 52 and a spring washer 53.

Referring to FIG. 9, the reamer bolt 51 has a hexagonal head and a large diameter reamer portion, a portion having a small diameter sufficient to withstand the clamping force, and a threaded portion at the tip and opposite the head for securing the nut 52.

The small diameter portion permits the diameter of the hole in the drive shaft hub for receiving the bolt to have a relatively small diameter, thus increasing the strength of the hub. When the reamer bolt 51 is in the hole, the reamer portion of the reamer bolt 51 is tightly engaged with the respective holes in the flange 37 of the driven shaft hub 36 and the fixed flange 42 of the spring assembly holder 41, thus being able to withstand a large torque, the small diameter portion of bolt 51 extends through the hole 34 in the disk-shaped projection 33 of the drive shaft hub 32. Said hole 34 has as large a diameter as possible to permit shock absorption by deflection of the coil springs, so that the reamer bolt 51 and said hole 34 are out of contact with each other during operation. In the demountable flange 43 of the spring assembly holder 41 and the stop disk 48 the hole 49 has a diameter just sufficient for receiving and removing the reamer bolt 51. In FIG. 9, the spring seat 39 and spring 40 correspond to the same parts in the first embodiment.

The shaft coupling shown in FIG. 10 is a further embodiment of the present invention. It happens sometimes that a shaft coupling is subjected to an impulse force in the axial direction tending to separate the drive shaft and the driven shaft. In such case, the coupling shown in FIG. 1 receives an impulse force on the bolts 19, causing the bolt to come lose. Then the stop disk 18 slips off the spring assembly holder 11 so that the spring seat 25 or 26 may be disconnected from the projection 3 on the drive shaft hub 2. The shaft coupling shown in FIG. 10 is effective against an impulse force in the axial direction.

As shown in the figure, the drive shaft hub 61, the driven shaft hub 65, the spring seat 77 the spring 78, etc. have the same construction as the corresponding parts of the shaft coupling shown in FIG. 1.

The body 68 of the spring assembly holder 67 has, at one end thereof, a spring-seat-supporting disk 69 integrally connected with the cylindrical ring-shaped section 68. Said disk 69 includes the portions equivalent to the demountable flange 13 and the stop disk 18. In order to support the spring seat 77 by the spring seat supporting disk 69, the disk 69 has recesses 70 in positions corresponding to the spring assembly receiving openings 63 in the projection 62 of the drive shaft hub 61. Said recesses 70 support one end of the spring seat 77. The ring-shaped section 68 of the spring assembly holder 67 has a flange cover 71 fixed on the other end from the end on which the spring assembly supporting disk 69 is located. The flange cover 71 has recesses 72 to support the other ends of the spring sears 77 from the ends supported in supporting disk 69.

Once the projection 62 on the drive shaft hub 61 is positioned within the ring-shaped section 68, the flange cover 71 is secured to section 68. Fixing of the flange cover 71 on the section 68 is by bolts 73 and welding 74.

After the spring seats 77 with the springs 78 therein are inserted into the receiving recesses in the spring assembly holder 67, the spring assembly holder 67 is fixed to the driven shaft hub 65 by connecting the flange 66 of the driven-shaft hub 65 with the flange 75 of the spring aeembly holder 67 by the bolts 76.

As described above, the spring assembly holder 67 of the shaft coupling of this embodiment has an integral spring seat supporting disk 69. Said disk 69 is thick and strong except at the location of said recesses 70. Also the bolts 76 connecting the driven shaft hub 65 with the spring assembly holder 67 make the connecting strong. Therefore, the spring assembly holder 67 can stand whatever impact is given the shaft coupling in the axial direction; there will occur no such troubles as described above. The bolts of the spring assembly holder will not be damaged, and the springs and the spring seats will not slip off the spring assembly holder.

Figure 11:
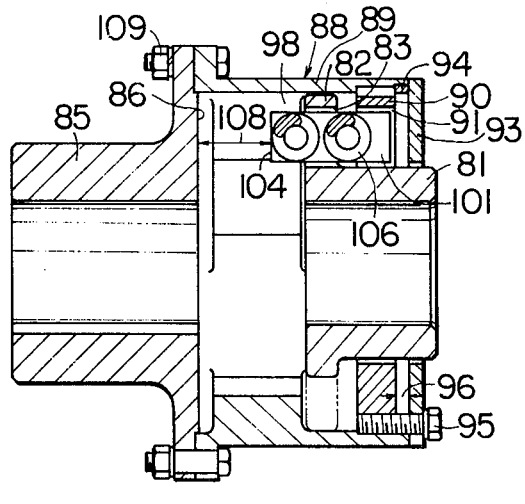
FIG. 11 is an axial sectional view of a shaft coupling the drive shaft hub of which is movable to a relatively great extent in the axial direction.
Figure 12:
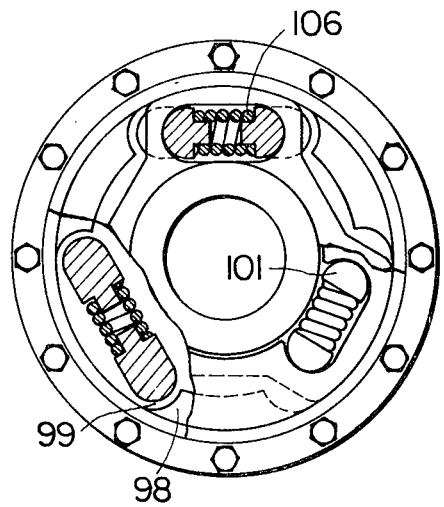
FIG. 12 is a transverse sectional view of the shaft coupling of FIG. 11.

A shaft coupling shown in FIGS. 11 and 12 is so constructed that the drive shaft hub can shift to some extent in the axial direction. In some torque transmitting systems, it is very helpful to be able to move the drive shaft more or less in the axial direction in case bearings, shaft coupling, etc. must be assembled or dismantled for repair. The shaft coupling of this embodiment is constructed to meet this need.

In these figures, the drive shaft hub 81 and the driven shaft hub 85 have the same construction as the corresponding parts of the shaft couplings of the above described embodiments.

The removable flange 90 is inserted into the ring-shaped section 89 of the spring assembly holder 88 from one end down near the central part thereof. Also, said end has a stop disk 93 fixed to the removable flange 90 by bolts 95. The removable flange 90 is fixed to the ring-shaped section 89 of the spring assembly holder 88 by the bolts 94 and a bolt (not shown) running through the stop disk 93. A gap 96 is provided between the removable flange 90 and the stop disk 93. Further, the removable flange 90 has recesses 91 acting as spring assembly receiving recesses.

The middle of the ring-shaped section is provided with a plurality of projections 98 projecting inwardly, which define between them circumferentially extending spaces 99 which are spring assembly spaces.

Figure 13:
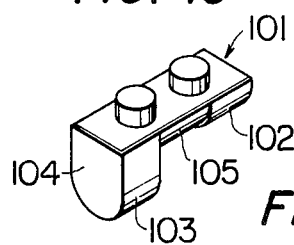
FIG. 13 is a perspective view of a spring seat used for the shaft coupling of FIG. 11.

As shown in FIG. 13, each spring seat 101 has one semi-cylindrical face 103 projecting over the other semi-cylindrical face 102. A pair of opposed spring seats 101 constitute a set for receiving springs 109. Each pair of spring seats 101 is mounted in the ring-shaped section 89 in a spring assembly receiving opening 83 in the projection 82 on the drive-shaft hub 81 with the semi-cylindrical faces 102 in the spring assembly receiving recesses 91 in the demountable flange 90, and the projecting cylindrical faces 103 in the spring assembly receiving spaces 99 between the projections 98 on the section 89.

The spring assembly holder 88 is connected with the driven shaft hub 85 by bolts 109. If the drive shaft hub 81 moves to the left in FIG. 11, the projection 82 thereon engages the sides of the cylindrical faces 103 of the spring seat 101; the drive shaft hub 81 is engaged with the spring seats 101; and the end faces 104 of the spring seats 101 travel a distance 108 until they hit the end face 86 of the driven shaft hub 85.

Also, the semi-cylindrical face 102 of the spring seat 101 is provided with a recessed portion 105, with which is engaged in the spring receiving recesses 83 in the projection 82. Therefore when the drive shaft hub 101 moves to the right, the spring seat 81 moves together with the drive shaft hub 81. If the projection 82 and the spring seat 101 move together because of friction between them, it is not necessary to provide said recessed portion 105.

Figure 14:
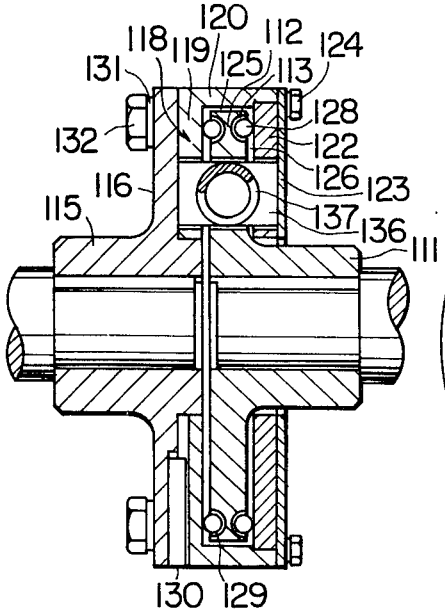
FIG. 14 is an axial sectional view of a shaft coupling suited for use where a large force acts in the axial direction.
Figure 15:
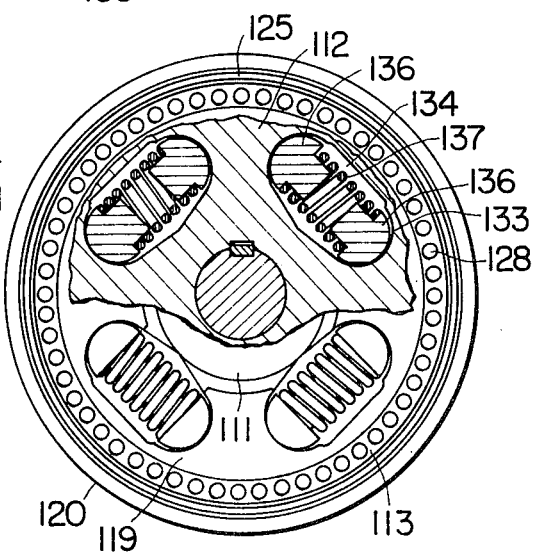
FIG. 15 is a transverse sectional view of the shaft coupling of FIG. 14.

A further embodiment is shown in FIGS. 14 and 15:

At the end of the drive shaft hub 111 there is provided a disk-shaped projection 112, which is surrounded by the fixed flange 119 removable flange 122 and also a cylindrical, ring-shaped portion, said parts constituting the spring assembly holder 118 in such manner as to leave a radial gap 125 and an axial 126.

On both sides on the disk-shaped projection 112 of the drive shaft hub 111 is respectively semi-circular cross-section ball groove 113, which is to be filled with a plurality of spherical ball bearings. In this embodiment, the grooves 113 are so provided that when ball bearings 128 are in the groove a gap 129 is left in the axial direction of the coupling, so that the disk-shaped projection 112 contacts the fixed flange 119 and the removable flange 123 of the spring assembly holder 118 in the axial direction only through the ball bearings 128; and during rotation, the ball bearings 128 function as thrust bearings.

At the end of the driven shaft hub 115 is provided a radial flange 116. Said flange 116 and the fixed flange 119 of the spring assembly holder 118 are integrally connected by bolts 132 and spring washers 131, and a key 103 is engaged between the flanges.

In the spring assembly holder 118, there are four spring assembly receiving openings 134, each of which is constituted by a recess in the fixed flange 119 and the removable flange 122 and an aligned opening in the side-shaped projection 112 on the drive shaft hub 111. The openings each have two semi-cylindrical faces 133 at the opposite ends. Each spring assembly consists of a spring 137 and two spring seats 136 mounted respectively on opposite ends of the spring 137, the assemblies being positioned in the spring assembly openings 134 with the spring seats 136 engaging the spring seat receiving faces 133. Each of the spring seats has a circular projection thereon engaged within the coil spring 137, and has a semi-cylindrical face on the reverse side.

In the figures there is shown one coil spring in each spring assembly receiving opening 134. If possible from the standpoint of design more than two coil springs should be used so as to accomodate a larger torque.

At the end of the ring shaped section 120 of the spring assembly holder 118 a stop disk 123 is attached by bolts 124. Said disk 123 is for preventing the spring assemblies of slipping out from the body 120.

Figure 16:
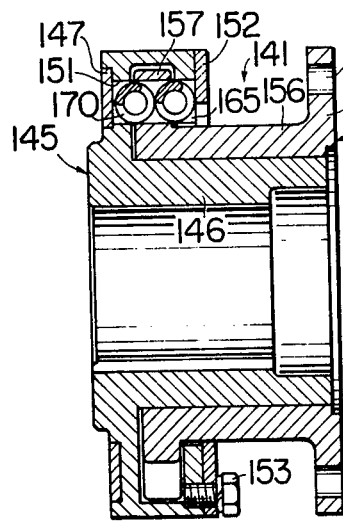
FIG. 16 is an axial sectional view of a shaft coupling capable of being used with a universal coupling.
Figure 17:
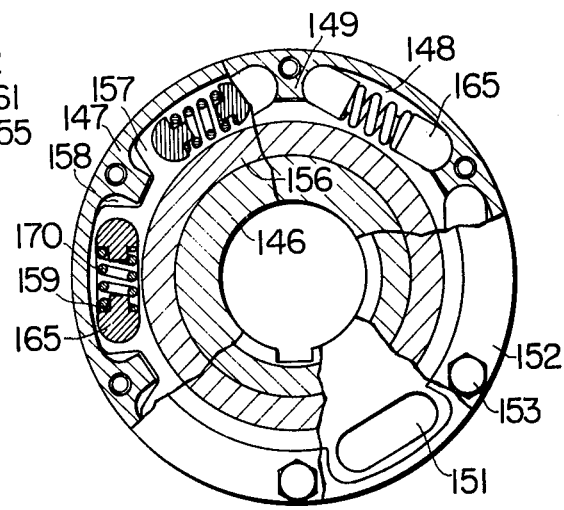
FIG. 17 is a transverse sectional view of the shaft coupling of FIG. 16.

In the shaft coupling of this embodiment, balls 128 are retained between the projection 112 on the drive shaft hub 111 and the fixed flange 119 and the removable flange 122 of the spring assembly holder 118. Therefore, even if force is applied to the coupling in the axial direction, there is no direct contact between the projection and the flanges; also, they will not seize because the balls 128 function as thrust bearings, FIGS. 16 and 17 show a still further embodiment of the present invention.

The shaft coupling 141 of this embodiment is constituted mainly by a driven shaft hub 145, a drive shaft hub 155, spring seats 165 and coil springs 170. The spring assembly holder is integral with the driven shaft hub 145.

The driven shaft hub 145 has a ring-shaped flange 147 integrally connected to one end of a cylindrical portion 146. Said flange 147 has a ring-shaped space 148 open toward the other end of the cylindrical portion 146. Projecting into the ring-shaped void space 148 from the end of the flange 147 which is toward the drive end of the coupling are six projections 149 spaced at intervals of 60° and each having concave circular sides facing the side of the next adjacent projection to define spring receiving spaces therebetween. At the end of the ring-shaped flange 147 at positions corresponding to the spaces between adjacent projections 149 there are provided elongated recesses 151, which have semicircular faces at both ends having a radius of curveture the same as that of the side surfaces of said projections 149. A stop disk 152 is mounted the end face of the open end of the ring-shaped flange 147 by bolts 153 for easy removal and to cover the open end of said ring-shaped space 148.

The drive shaft hub 155 has a cylindrical portion 156 which fits loosely around the cylindrical portion 146 of the driven shaft hub 145. At the end of said cylindrical portion 156 there is provided a disk-shaped projection 157 positioned in the ring-shaped space 148 formed by the ring-shaped flange 147 on the driven shaft hub 145. In said projection 157 there are provided six openings 158 at positions corresponding respectively to the projections 149 on the ring-shaped flange 147, so that the projections 157 do not hit the projections 147 when the projection 157 is inserted into the ring-shaped spaces 148. In the projections 157 there are provided elongated holes 159, each hole having a circular face at both ends having the same radius of curvature as that of the side faces of said projections 157; the shape of each said hole 159 is the same as that of the long recesses 151 in the ring-shaped flange 147. At the other end of the cylindrical portion 156 there is provided a flange 161 to be connected with a universal shaft coupling (not shown) by bolts through holes 162.

When the projection 157 on the drive shaft hub 155 are inserted into the ring-shaped space 148 of the ring-shaped flange 147 on the driven shaft hub 145 so as to connect the hubs 145 and 155, there are produced spaces between the ring-shaped flange 147 and the cylindrical portion 156 of the drive shaft hub 155 by the openings 151 in the ring-shaped flange 147 themselves and also by the holes 159 in the projections 157, these spaces functioning as the spring assembly receiving openings for receiving spring seats 165 and coil springs 170.

Each spring seat 165 has the same structure as shown in FIG. 13. When it is inserted into the spring assembly receiving opening, its semicylindrical face contacts the circular face of the adjacent projection 149, the opening 151, and the hole 159 in the projection 157. The spring seat 165 is received by the spring assembly receiving opening formed by the ring-shaped flange 147 and the projections 157 within said flange 147, with such tightness as to allow itself to slide. Therefore, the shaft coupling 141 cannot accomodate angular misalignment, while the abovementioned couplings can, but this coupling 141 is very much stronger than the others.

Figure 18:
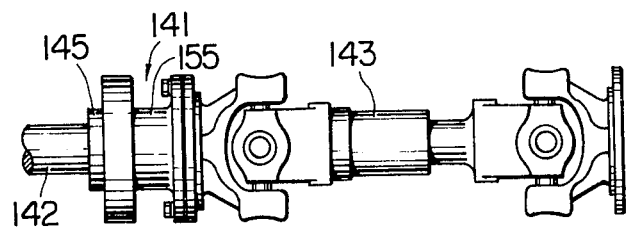
FIG. 18 is a plan view of the connection of a universal coupling with the shaft coupling of FIG. 16.

FIG. 18 shows the thus constructed shaft coupling 141 connected with a universal shaft coupling 143 by a bolt 144. Said shaft coupling 141 has a transmission shaft 142 connected with it by means of a key.

Figure 19:
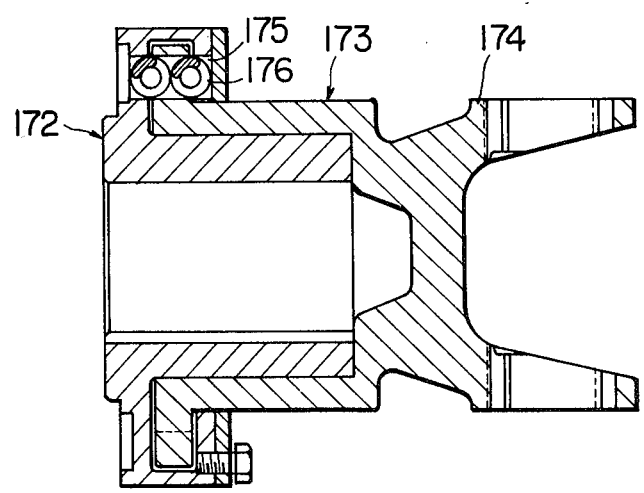
FIG. 19 is an axial sectional view of another embodiment of the shaft coupling capable of being connected with a universal coupling.

FIG. 19 shows a still further embodiment of the shaft coupling of the present invention, using the same elements as used in the above-described embodiments, such as the driven shaft hub 172, the spring seats 175 and the coil springs 176. The driven shaft hub 173 is different from that of the other embodiments in that it has an integral fork section 174 therein forming part of a universal shaft coupling. As a result of this design, the outer diameter and length of a buffer shaft coupling can be made smaller, if such a shaft coupling is to be used by itself on jointly with a universal shaft coupling; and also the connection is considerably stronger than when a buffer shaft coupling is connected with a universal shaft coupling by a bolt.

Figure 20:
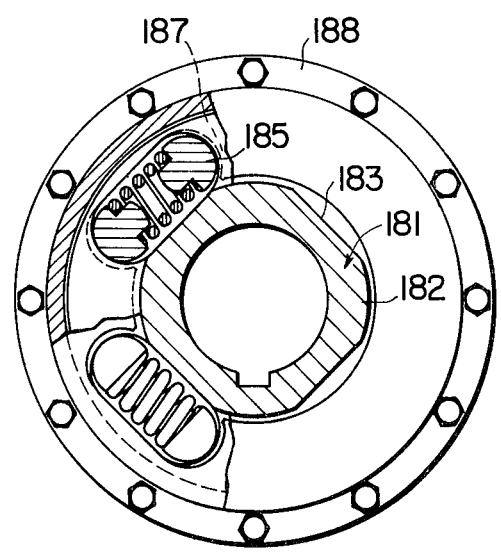
FIG. 20 is a partly broken away transverse sectional view of a shaft coupling according to the inventor with hubs having a polygonal cross-sections for making the shaft coupling smaller-sized.

FIG. 20 shows a shaft coupling which is made compact by making the outer diameter smaller. The cylindrical body 182 of the drive shaft hub 181 has a prologonal cross-section. That is to say, the outer surface of the part of the body 182 where spring seats 185 are positioned, is reduced to the minimum size required for the body 182 to be strong enough for the transmission of torque, thereby producing a flat 183. Thus, the spring seat 185, can be positioned nearer the center of the shaft, making the outer diameter of the projection 187 and the flange 188 much smaller, and making the shaft coupling much more compact. Such a shaft coupling is suited for use in a limited space.

The spring which is mounted on the above described spring seats has been described as a single-coil spring with one central axis, but such a spring can transmit a large load only by making it large in size, necessarily resulting in a greater size of the shaft coupling.

The spring seats and springs shown in FIGS. 21 and 22 are especially suited for a shaft coupling for the transmission of a large torque. In FIG. 21, the spring seat 191 is provided with a stepped cylindrical projection 192, and two coil springs 193 and 194 are mounted thereon to carry the torque load.

In FIG. 22, a special elastic mechanism 201 is used in addition to the single coil spring 200. As shown in FIG. 23a, an elastomer 204 made of urethane rubber or the like is inserted into a cylinder with a clearance 203 left therearound; and a ram 205 is positioned in the cylinder 202 so as to slide parallel to the wall face 206 of the cylinder 202.

On the edge of the open end of the cylinder is a plate 207 fixed by bolts 208 to prevent escape of the ram 205. The thus constructed elastic mechanism 204 is provided in the end portion of the cylindrical projection 196 of one spring seat 195 as shown in FIG. 22. Where the spring seats 195 and 197 are forced together, the coil spring 200 is compressed; when it has contacted a certain amount, the end face 199 of the projection 198 on the spring seat 197 contacts the end fact of the ram, so that part of the force is taken by the elastic mechanism 201. If the coil spring is compressed further, the elastomer 204 of the elastic mechanism 201 fills the cylinder 202 as shown in FIG. 23b. After that, the elastomer 204 is placed under static pressure over its complete cross-section, suddenly having a great resistance to deformation, and only contacts a very small amount under a large compression load. When the elastic mechanism 201 takes part of the load, the amount of compression of the coil spring 200 is small, and there is no possibility of production of excessively great stress on the coil spring 200. Therefore, the coil spring 200 and the spring seats 195 and 197 equipped with the elastic mechanism 201 make possible transmission of a large torque.

According to said embodiment, one of the opposed spring seats 195 and 197 is equipped with the elastic mechanism 201, but it is possible to have both spring seats equipped with elastic mechanisms. When transmitting a large torque, when no force is action on the ram 205, it is possible to have no clearance such as the clearance 203 between the elastomer 204 and the wall face 206 of the cylinder 202. In stead of a coil spring, a volute spring or a disc spring can be used.

In a still further embodiment of the present invention, a shaft coupling is provided which can accomodate greater mutual misalignments of shafts, therefore having greater buffering capacity, then the above described shaft couplings according to the present invention.

In order to accomodate great mutual misalignments, it is recommended that the spring seats be inserted into the buffer receiving portion with a large gap left. But if the gap is too large, the transmission shaft may be supported only unstably, or bending stress will act on the coil spring, thus making it undesirable to increase the gap beyond a certain limit.

To overcome this limitation two shaft couplings can be connected as a set.

In a shaft coupling shown in FIG. 24, a coupling unit 211 is constructed on each transmission shaft hub 212 and has a spring assembly holder 215, spring seats 221 and springs 222. These members have the same construction as the corresponding parts of the above described embodiments.

Each transmission shaft hub 212 is provided at its intermediate portion with a disk-shaped projection 214, and is positioned in the spring assembly holder 215. On the end of said holder 215 is a spring seat supporting disk 216, and the other end thereof has a flange cover 217 fixed thereto by bolts 218. Pairs of spring seats 221 each having a coil spring 222 are respectively inserted in the spring assembly receiving portion 220 and the spring receiving openings provided respectively in the projection 213 on the transmission shaft hub 212, the spring seat supporting disk 216 of the spring assembly holder 215 and the flange cover 217. The two coupling units 211 which are constructed as described above, are connected by a bolts 225 with a spacer 227 therebetween. The spacer 227 is to prevent the spring seat 221 on one coupling unit from moving into the adjacent coupling into the adjacent coupling unit 211 and interfering with the function of the spring seat 221 of said adjacent coupling unit 211.

Because this shaft coupling is made of two coupling units 211, it is capable of accomodating twice the mutual misalignment and impact than can be accomodated by either of the shaft couplings above.

A similar effect can be achieved by two shaft couplings connected by an intermediate shaft. Generally speaking, the mutual misalignments of shafts can be broken down into axial excentricity in the radial direction, displacement in the axial direction and angular misalignment. In a shaft coupling having an intermediate shaft, there is danger of vibration of the intermediate shaft in the radial direction during rotation, if a gap is produced for accomodation of eccentricity in the radial direction. Therefore, in such a shaft coupling, the construction should be such that displacement in the axial direction and angular misalignment are accomodated, but eccentricity in the radial direction is left unaccomodated.

Figure 26:
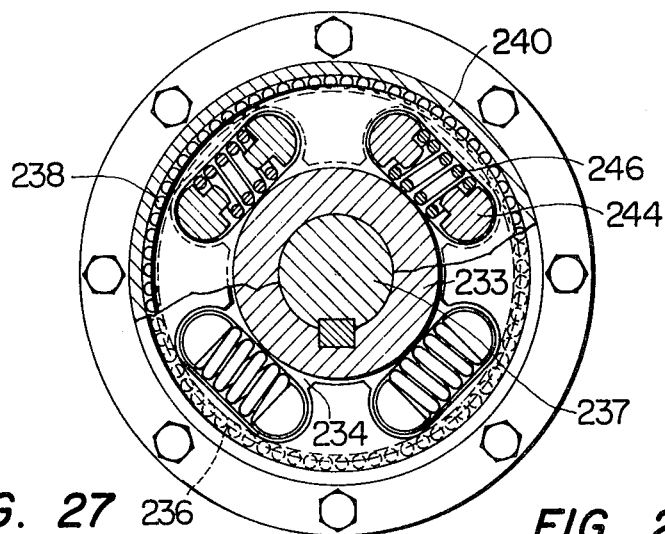
FIG. 26 is a transverse sectional view of the shaft coupling of FIG. 25.

FIG. 25 and 26 show such a shaft coupling having an intermediate shaft.

The following members of this shaft coupling have the same construction as the corresponding parts of the described shaft couplings:

The drive shaft hub 231, the driven shaft hub 232, the spring assembly holder 240, spring seats 244 and springs 246.

The intermediate shaft hub 233 has an intermediate shaft 237 connected therewith. At one end of the intermediate shaft hub 233 there is provided a disk-shaped projection 234, which has spring assembly receiving openings 235. On the outer surface of the circumference of the projection 234 there is provided a circumferential semicircular groove 236 having a depth somewhat less than the radius of ball bearings 238, which are placed in the semi-circular groove 236 and roll in the circumferential direction guided by said groove 238.

At both ends of the intermediate shaft 237 are respectively provided shaft couplings 230. In the shaft coupling 230, balls 238 in the semi-circular groove 236 contact the inner surface 242 of the ring-shaped section of the spring assembly holder 240.

It is clear from the foregoing that the thus constructed shaft coupling functions well in buffering and accomodation of mutual misalignments. As described above, the shaft coupling of this embodiment has the intermediate shaft hub 233 and the spring assembly holder 240 in contact with each other through the ball bearings 238, thus preventing eccentricity in the radial direction. If angular misalignment occurs between the intermediate shaft 237 and the driven shaft 229, there will occur angular misalignment between the spring assembly holder 240 and the intermediate shaft hub, since the driven shaft hub 232 and the spring assembly holder 240 are integrally connected. If such angular misalignment occurs, there will be produced a small radial gap between the ball bearings 28 and the semi-circular groove 236 or between the ball bearings 238 and the inner surface 242 of the body 241 of the spring assembly holder 240, but the size of the thus produced gap is negligible, because the angle of misalignment is small.

Figure 27:
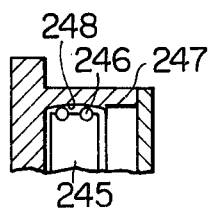
FIG. 27 in a partial sectional view of another embodiment of the shaft coupling of FIG. 25, in which a projection on the hub contacts the inside surface of the spring assembly holder through balls.

FIG. 27 shows a construction of a disk-shaped projection 245 in which ball bearings 246 are arranged in two lines. The arrangement of the ball bearings in two lines causes a smaller pressure on the ball bearings. The inner surface 248 of the body 247 which the ball bearings 246 contact, is concave so as to accomodate angular misalignment. Because of this construction, angular misalignment is accomodated without difficulty; even though the shafts stay misaligned, vibrations in the radial direction decrease, limiting displacement of the intermediate shaft in the axial direction.

Figure 28:
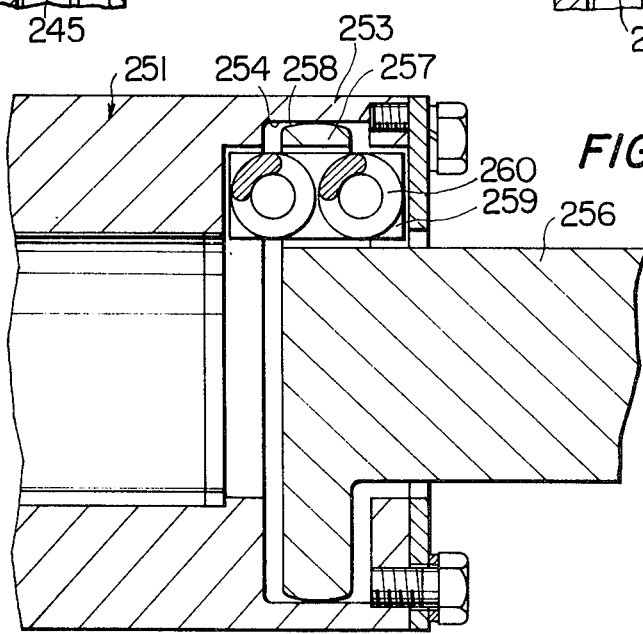
FIG. 28 is an axial sectional view of another embodiment of the shaft coupling consisting of an intermediate shaft combined with two subsidiary shaft couplings.

FIG. 28 shows another shaft coupling having an intermediate shaft as a still further embodiment of the present invention. In this shaft coupling, the drive shaft hub 251 is integral with the spring assembly holder 253; and the intermediate shaft 256 is provided, at its end portion, with a disk-shaped projection 257.

Said spring assembly holder 253 has the same construction as the described spring assembly holder. The disk-shaped projection 257 has the outer surface in the shape of a convex face 258 instead of using ball bearings. The convex face 258 contacts the inner surface 254 of the spring assembly holder 253 upon inclination relative to the drive shaft hub 251.

The spring seat 259 and the spring 260 have the same construction as the corresponding parts of the other shaft couplings.

In this shaft coupling no ball bearings are used, making the construction simple. The drive shaft hub 251 is integral with the spring assembly holder 253; and the intermediate shaft 256 is provided with a disk-shaped projection 257, making the overall size of the shaft coupling smaller. But there is unavoidably produced some friction because of the sliding contact between the convex face 258 of the projection and the inner surface 254 of the spring assembly holder 253.

Figure 29:
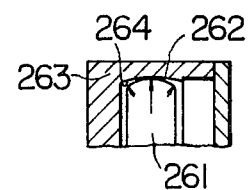
FIG. 29 in a partial sectional view of another embodiment of the shaft coupling of FIG. 28, in which a projection on the hub directly contacts the inside surface of the spring assembly holder.

FIG. 29 shows a shaft coupling in which the spring assembly holder 263 has the inner surface 264 in the form of a concave face, making the pressure produced by contact with the convex face 262 of the projection 261 smaller, thus reducing wear caused thereby.

It is possible to modify the shaft coupling shown in FIG. 25, to that as shown in FIG. 28 or FIG. 29 so that no ball bearings are used. On the contrary, it is possible to so modify the shaft coupling shown in FIG. 28 as to use ball bearings, to obtain the construction of FIG. 25 or FIG. 27. Furthermore, springs such as shown in FIG. 21 or FIG. 22 may be used in the shaft couplings equipped with an intermediate shaft.

In the above description the hubs are identified as a drive shaft hub and a driven-shaft hub, but such designations are not essential. From a functional standpoint, no problems occurs if the part of the coupling on the driven shaft is mounted to the hub of the drive shaft, and vice versa.

What is claimed is:

1. A shaft coupling comprising:
 a first shaft hub having a disk-shaped projection thereon, said projection having circumferentially elongated spring assembly receiving openings therein spaced around the circumference of said projection and which have opposed semi-cylindrical faces at opposite circumferential ends thereof;
 a second shaft hub;

a spring assembly holder on said second shaft hub having a ring-shaped section thereon, a fixed radical flange in said section at the end toward said second shaft hub, a removable radial flange on the other end of the section toward the first shaft hub, a stop disk mounted on said other end of the ring-shaped section, said disk-shaped projection being in said space between said flanges with a gap left between said projection and said flanges and between the periphery of said projection and the inner surface of said ring-shaped section, said fixed flange and said removable flange having circumferentially elongated spring assembly receiving recesses therein with opposed semi-cylindrical faces at the opposite circumferential ends thereof, said recesses being aligned with said openings in the rest position of said hubs for forming spring assembly receiving spaces;

said assembly having gaps sufficiently large for accomodation of rotational misalignment, angular misalignment and displacement between the first and second shaft hubs, said gaps being between said projection and each of said flanges, between the periphery of said first shaft hub and the inner surface of said removable radial flange, between the periphery of said projection and the inner surface of said ring-shaped section, between the respective recesses of said fixed radial flange and said removable radial flange and the corresponding spring assemblies, and between the end faces of said stop disk and of said second hub and the opposed end faces of said spring seats;

spring assemblies in each of said spaces and having a pair of spaced opposed spring seats at the opposite ends of the assembly having outside semi-cylindrical surfaces with a radius of curvature sufficiently smaller than the radius of curvature of the ends of said openings and said recesses for accomodating misalignment of said shaft hubs, and at least one spring extending between said seats and having the ends engaged with said seats, said spring assemblies being in said spring assembly receiving spaces with the semi-cylindrical surfaces on said seats engaged with the semi-cylindrical faces of said openings and recesses and the axis of said spring parallel to a tangent to the hubs.

2. A shaft coupling as claimed in claim 1 in which said spring assembly holder further has a plurality of bolts extending through said fixed flange, said removable flange and said stop disk and through said ring-shaped section for holding said spring assembly holder together.

3. A shaft coupling as claimed in claim 1 in which said spring seats each have a semi-cylindrically shaped projecting portion at each end thereof for engaging with the respective semi-cylindrical faces of the recesses in said flanges, said semi-cylindrical faces of the openings in said disk-shaped projection extending into the spaces between said projections for engaging the seats and the side faces of said projections engaging said disk-shaped projection when axial forces are exerted in opposite directions on the shafts on which said hubs are mounted for moving said spring seats when the hub carrying the disk-shaped projection moves axially relative to the other hub.

4. A shaft coupling as claimed in claim 1 in which the axially directed faces of said disk-shaped projection have at least one semi-circular cross-section groove therearound adjacent the periphery thereof, and ball bearings in said grooves engaged with the faces of the opposed flanges when the hub having the disk-shaped projection thereon is shifted axially relative to the other hub.

5. A shaft coupling as claimed in claim 1 in which each spring assembly has a plurality of springs between each pair of seats.

6. A shaft coupling as claimed in claim 5 in which said springs are side by side.

7. A shaft coupling as claimed in claim 5 in which said springs are coil springs and are concentric.

8. A shaft coupling as claimed in claim 1 in which the hub on which the disk-shaped projection is mounted is polygonal in cross section and said springs in said spring assemblies lie adjacent the surfaces of said polygonal hub, whereby the outside diameter of the shaft coupling can be made smaller.

9. A shaft coupling as claimed in claim 1 in which said spring assembly further comprises an elastic means between said seats in each pair of seats.

10. A shaft coupling as claimed in claim 9 in which said elastic means comprises a body of an elastic material, a recess in one of said seats in which said body is positioned, said recess being larger than said body for leaving a space around said body, and a ram slidable into and out of said recess and having an arm projecting toward to other seat of a pair of seats.

* * * * *